Nov. 26, 1968    J. D. CUTHBERT ET AL    3,413,506
ZnTe:O ELECTROLUMINESCENT DEVICE
Filed July 6, 1966

EMISSION SPECTRUM OF OXYGEN
IN ZnTe AT ROOM TEMPERATURE

INVENTORS  J. D. CUTHBERT
J. J. HOPFIELD
D. G. THOMAS

BY David P. Kelley
ATTORNEY

3,413,506
ZnTe:O ELECTROLUMINESCENT DEVICE

John D. Cuthbert, Mount Freedom, John J. Hopfield, Princeton, and David G. Thomas, Summit, N.J., assignors to Bell Telephone Laboratories, Incorporated, Berkeley Heights, N.J., a corporation of New York
Filed July 6, 1966, Ser. No. 563,169
5 Claims. (Cl. 313—108)

ABSTRACT OF THE DISCLOSURE

An electroluminescent device comprises an M-i-p ZnTe crystal structure having an oxygen concentration of $10^{17}$ or more atoms per cubic centimeter. The oxygen substitutes isoelectronically for Te in the crystal, providing traps for free electrons injected into the crystal when a voltage is applied. The trapped electrons attract holes, and red light is emitted, at room temperature, when the hole and electron recombine.

---

This invention relates to solid state optical devices and, more particularly, to such devices which emit light under the influence of an applied electric field, i.e., electroluminescent devices, and to methods of making such devices.

The rapid and expanding development of many fields requiring optical displays or indicators, such as, for example, the computer field, have necessitated a search for new light emitting devices which perform better than existing devices. Long life, intensity of illumination, reliability, and simplicity are all desiderata which in one or more particulars are not supplied by the prior art. Incandescent sources are relatively short lived, for example, while gas discharge devices are generally unreliable. Among solid state devices, those that are photoluminescent require an additional light source for excitation and cathodoluminescent devices are generally far too complicated in their mode of excitation.

Electroluminescent devices that are excited by an applied voltage give promise of being a satisfactory solution to the shortcomings of the prior art.

The present invention is a solid state device which emits red light at room temperatures upon the application of a small voltage, typically five to ten volts D.C.

Our invention is based upon the discovery of a luminecesent center in zinc-telluride (ZnTe) caused by the inclusion of oxygen in sufficient quantities in the crystal, the optical transition occuring at an oxygen atom at a tellurium site.

In an illustrative embodiment of the invention, an M-i-p, that is, metal-intrinsic p-type, zinc telluride crystal having a minimum concentration of $10^{17}$ oxygen atoms per cubic centimeter is biased from a suitable source such that electrons created by breakdown are swept from the i region into the p region of the crystal. The oxygen atoms trap electrons, and, as a consequence holes are attached and, with the trapped electrons, form bound exciton states, which may be referred to as isoelectronic acceptors. There then occurs a radiative recombination of these holes and electrons, producing a visible light output in the red region of the spectrum. The efficiency of illumination depends upon the oxygen concentration in the crystal, with a minimum of $10^{17}$ oxygen atoms per cubic centimeter ordinarily being required for discernible light output. Relatively high efficiencies, i.e., ten percent or more, may be achieved at room temperatures with larger oxygen concentrations, the maximum concentration being determined by the solubility of the oxygen in the ZnTe crystal.

The oxygen doping of the ZnTe is advantageously achieved by the addition of zinc oxide (ZnO) to the melt, in one case, or the creation of an oxygen containing atmosphere from zinc oxide decomposed through heat, in another case. In either case, it is desirable to anneal the doped crystal in a zinc atmosphere at approximately 1000° C. and quench rapidly to room temperature to prevent the oxygen atom from associating with other centers.

It is a feature of the diode of the invention that an electroluminescent crystal of ZnTe having both i and p regions contains a concentration of oxygen atoms of $10^{17}$ atoms per cubic centimeter or more.

It is another feature of the invention that the process for making the zinc telluride crystals includes the steps of introducing oxygen into the crystal to a concentration of $10^{17}$ oxygen atoms or more per cubic centimeter and annealing the crystal after growth, in a zinc atmosphere at approximately 1000° C., then quenching the crystal rapidly to room temperature.

The various features of the invention will be more readily understood from the following detailed description taken with the accompanying drawings, in which:

FIG. 1 is an illustration of a simple electroluminescent device embodying the principles of the invention and which emits red light, i.e., 6500 to 7500 A., at room temperatures.

Figure 1:
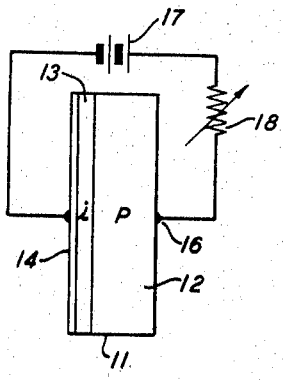
FIG. 1 is a schematic drawing of an illustrative embodiment of the invention.

The device 11 of FIG. 1 comprises a crystal 11 of ZnTe having a p-type region 12 and an i-type region 13. Typically the p-region is formed by growing the crystal from a melt containing zinc and tellurium with lithium, for example, as the dopant. It is to be understood that other suitable acceptor-type dopants may be used, lithium being mentioned here for illustrative purposes only. The i-region 13 is typically formed by the diffusion of aluminum into the substrate at, for example, 850° C. for five minutes in a zinc atmosphere to produce a thin high resistivity or substantially intrinsic region 13. Electrical contact may be made to the i-region by an evaporated indium layer 14, while contact to the p-region may be made by any suitable means, such as, for example, a gold contact 16. In order to achieve a good ohmic contact to the i-region, crystal 11 may be made in the form of a p-i-p sandwich, since electrical contact to an acceptor type material is generally quite simply achieved. Contact 14 is connected to the negative terminal of a suitable voltage source 17 while contact 16 is connected through a variable resistor 18 to the positive side of source 17.

The device of FIG. 1 is made electroluminescent through the addition of oxygen to the crystal to a minimum concentration of $10^{17}$/cc. oxygen atoms. Oxygen may be added in a number of ways. One way of achieving the desired concentration is through the "mineralization" of powdered ZnTe by heating in a furnace at approximately 1100° C. for three to four days. Crystals which are produced in this manner contain approximately $10^{18}$ oxygen atoms/cc.

A more precise way of achieving the desired oxygen concentration is to grow the crystals from a melt at, for example, 1305° C., containing several mole percent, e.g., 5 mole percent, zinc oxide with 95 mole percent ZnTe, after which the crystal is cooled. The melt can be contained in boron nitride, carbon or quartz vessels.

The oxygen may also be diffused into the ZnTe crystal by heating the crystal to approximately 1200° C. in an oxygen containing atmosphere which is conveniently produced at this temperature by having present ZnO to the extent of roughly one-tenth the weight of the ZnTe. A sealed quartz vessel is used in this process. Several hours are required for diffusion of the oxygen to a depth of approximately one millimeter from the surface of the crystal. Crystals are typically 5 x 5 x 2 mm. in size.

In all of the various methods for forming the oxygen doped crystals, association of the oxygen atoms with centers other than the tellurium is minimized by annealing the doped crystal after growth at approximately 1000° C. in one atmosphere of zinc for approximately three hours and quenching rapidly to room temperature.

In operation, when a sufficient voltage is applied to crystal 11, it emits red light. It is believed that when the voltage is applied to the high resistivity i-region avalanches, creating holes and electrons in much the same manner as an ionizing gas. The i-region is quite thin, of the order of a few microns, so that high electric fields are generated at this point. The electrons thus set free are swept into the p-region where a large percentage of them are trapped by the oxygen atoms. Holes existing in the p-region are in turn attracted by the trapped electrons, forming bound exciton states from which states radiative recombination of the electrons and holes occurs.

Figure 2:
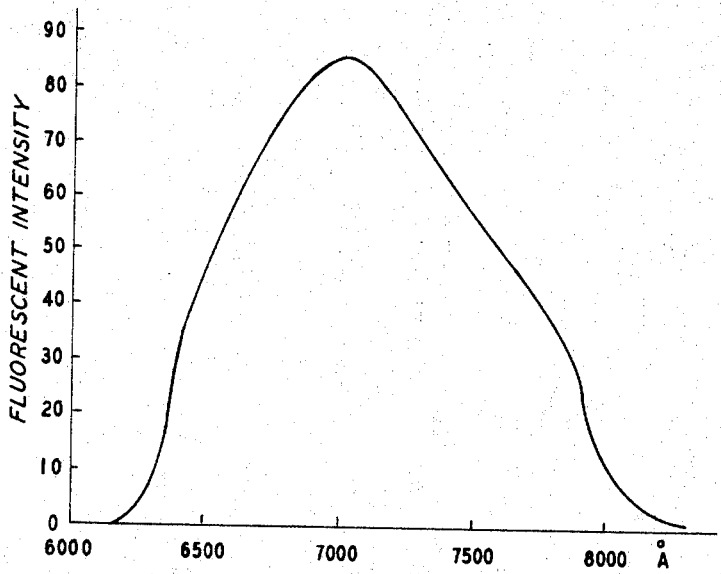
FIG. 2 is a diagram illustrating certain of the characteristics of the device of FIG. 1.

In FIG. 2 there is shown a curve of fluorescent intensity in arbitrary units of the radiation resulting from the recombination versus wavelength in angstroms at room temperature, for a ZnTe crystal having approximately $8 \times 10^{17}$ oxygen atoms/cc., with approximately eight volts applied. It can be seen that maximum intensity occurs at approximately 7000 A. The absolute intensity can, of course, be increased by increasing the voltage, and for this purpose variable resistor 18 is provided. Intensity or efficiency may also be increased by a greater concentration of oxygen atoms.

A large hole concentration in the p-region is desirable, and can be controlled through heavy lithium doping during formation of the p-region. During the formation of the p- and i-regions care must be taken to preserve the effects of the priorly performed zinc atmosphere annealing step to prevent association of other defects with the oxygen atoms as much as possible.

From the foregoing it can readily be seen that a simple efficient electroluminescent room temperature device is realized from application of the principles of the invention. Various modifications may occur to workers in the art without departure from these principles.

What is claimed is:
1. An electroluminescent device comprising a crystal of zinc telluride having an i-type region and a p-type region adjacent thereto, said crystal containing oxygen in a concentration of $10^{17}$ atoms or more per cubic centimeter.
2. An electroluminescent device as claimed in claim 1 wherein the i-type region is formed by diffusion of aluminum into the crystal.
3. An electroluminescent device as claimed in claim 1 wherein said p-type region contains lithium as the dopant.
4. An electroluminescent device comprising a crystal of zinc telluride having an i-type region and a p-type region adjacent thereto, said crystal having an oxygen concentration of $10^{17}$ or more atoms per cubic centimeter, and means for applying a voltage to said crystal sufficient to produce avalanching in the i-type region and the passage of electrons from the i-type region to the p-type region.
5. An electroluminescent device as claimed in claim 4 wherein the crystal has an M-i-p configuration with the p-type region biased positively with respect to the M-type region.

References Cited

UNITED STATES PATENTS 3,366,819   1/1968   Crowder et al. _____ 313—108

OTHER REFERENCES

Injection Electroluminescence in Metal-Semiconductor Tunnel Diodes by Eastman et al., Solid State Electronics, vol. 7, pages 313–108D, 879–885, Pergamon Press, 1964.

Electroluminescence From PN Junctions by Gershenzon et al., Bell Laboratories Record, October 1965, pages 358 to 363.

Electroluminescence Near Band Gap In Gallium Phosphide . . . Levels, by Foster et al., Applied Physics Letters, vol. 7, No. 3, Aug. 1, 1965, pages 65–67.

Pair Spectra Involving Donor and/or Acceptor Germanium on Gap by Gershenzon et al., Journal of Applied Physics, vol. 37, No. 2, February 1966, pages 486 to 498.

JAMES W. LAWRENCE, *Primary Examiner.*

R. JUDD, *Assistant Examiner.*